(12) United States Patent
Dreano, Jr.

(10) Patent No.: US 9,984,347 B2
(45) Date of Patent: May 29, 2018

(54) SYSTEM AND METHOD FOR ENHANCING DISTRIBUTION LOGISTICS AND INCREASING SURVEILLANCE RANGES WITH UNMANNED AERIAL VEHICLES AND A DOCK NETWORK

(71) Applicant: Frank Dreano, Jr., Oakland, FL (US)

(72) Inventor: Frank Dreano, Jr., Oakland, FL (US)

(*) Notice: Subject to any disclaimer, the term of this patent is extended or adjusted under 35 U.S.C. 154(b) by 229 days.

(21) Appl. No.: 14/818,329

(22) Filed: Aug. 5, 2015

(65) Prior Publication Data
US 2016/0185466 A1    Jun. 30, 2016

Related U.S. Application Data

(60) Provisional application No. 62/097,814, filed on Dec. 30, 2014, provisional application No. 62/104,361, filed on Jan. 16, 2015.

(51) Int. Cl.
| | |
|---|---|
| *B64F 1/32* | (2006.01) |
| *G06Q 30/06* | (2012.01) |
| *G06Q 10/08* | (2012.01) |
| *B64C 39/02* | (2006.01) |
| *H04W 84/00* | (2009.01) |

(52) U.S. Cl.
CPC ....... *G06Q 10/083* (2013.01); *G06Q 30/0635* (2013.01); *B64C 2201/06* (2013.01); *B64C 2201/128* (2013.01); *B64C 2201/20* (2013.01); *B64C 2201/201* (2013.01); *H04W 84/005* (2013.01)

(58) Field of Classification Search
CPC . B64C 2201/00; B64C 39/024; B64C 39/028; B64C 2201/12; B64C 2201/128; B64C 2201/14; B64C 2201/141; B64C 2201/145; B64C 2201/146; B64C 2201/20; B64C 2201/201; B64C 2203/00; H04W 84/005
See application file for complete search history.

(56) References Cited

U.S. PATENT DOCUMENTS 9,387,928 B1 * 7/2016 Gentry ................. B64C 39/024
9,489,852 B1 * 11/2016 Chambers ............ B64C 39/024
(Continued)

*Primary Examiner* — Thomas G Black
*Assistant Examiner* — Sara J Lewandroski
(74) *Attorney, Agent, or Firm* — Jason T. Daniel, Esq.; Daniel Law Offices, P.A.

(57) ABSTRACT

A system and method for enhancing distribution logistics and surveillance ranges with unmanned aerial vehicles (UAV) and at least one dock in a dock network. The UAV remains in communication with the dock for enhancing distribution logistics of at least one package and increasing the range of surveillance for the unmanned aerial vehicle. From the dock, the UAV delivers the package to a destination point, obtains the package from a pick up point, recharges the unmanned aerial vehicle throughout the network of docks, and increases the range of distribution and surveillance. A logistics software controls the delivery and surveillance. A wireless communication device enables communication between the UAV and the dock. Light indicators indicate status of the package and the operational status of the UAV. A camera captures an image of the package in the dock. A motion detector detects the UAV for regulating access for loading/unloading and docking.

20 Claims, 12 Drawing Sheets

(56) References Cited

U.S. PATENT DOCUMENTS

| | | | |
|---|---|---|---|
| 2004/0135031 A1* | 7/2004 | Stupakis | B64C 39/02 244/120 |
| 2013/0332008 A1* | 12/2013 | Herman | B64C 39/024 701/2 |
| 2014/0032034 A1* | 1/2014 | Raptopoulos | G08G 5/0069 701/25 |
| 2014/0330603 A1* | 11/2014 | Corder | G06Q 10/0631 705/7.12 |
| 2014/0347482 A1* | 11/2014 | Weinmann | H04N 5/247 348/144 |
| 2015/0120094 A1* | 4/2015 | Kimchi | B64C 39/024 701/3 |
| 2016/0033966 A1* | 2/2016 | Farris | G01C 21/00 701/15 |
| 2016/0068265 A1* | 3/2016 | Hoareau | G05D 1/102 701/3 |
| 2016/0159496 A1* | 6/2016 | O'Toole | B64F 1/32 244/110 E |
| 2016/0196756 A1* | 7/2016 | Prakash | B64C 39/024 701/3 |
| 2016/0375779 A1* | 12/2016 | Wang | B64F 1/36 701/2 |
| 2017/0032315 A1* | 2/2017 | Gupta | G06Q 10/08 |
| 2017/0162064 A1* | 6/2017 | Ubhi | G08G 5/0069 |
| 2017/0203857 A1* | 7/2017 | O'Toole | B64F 1/32 |
| 2017/0225802 A1* | 8/2017 | Lussier | B64F 1/222 |

\* cited by examiner

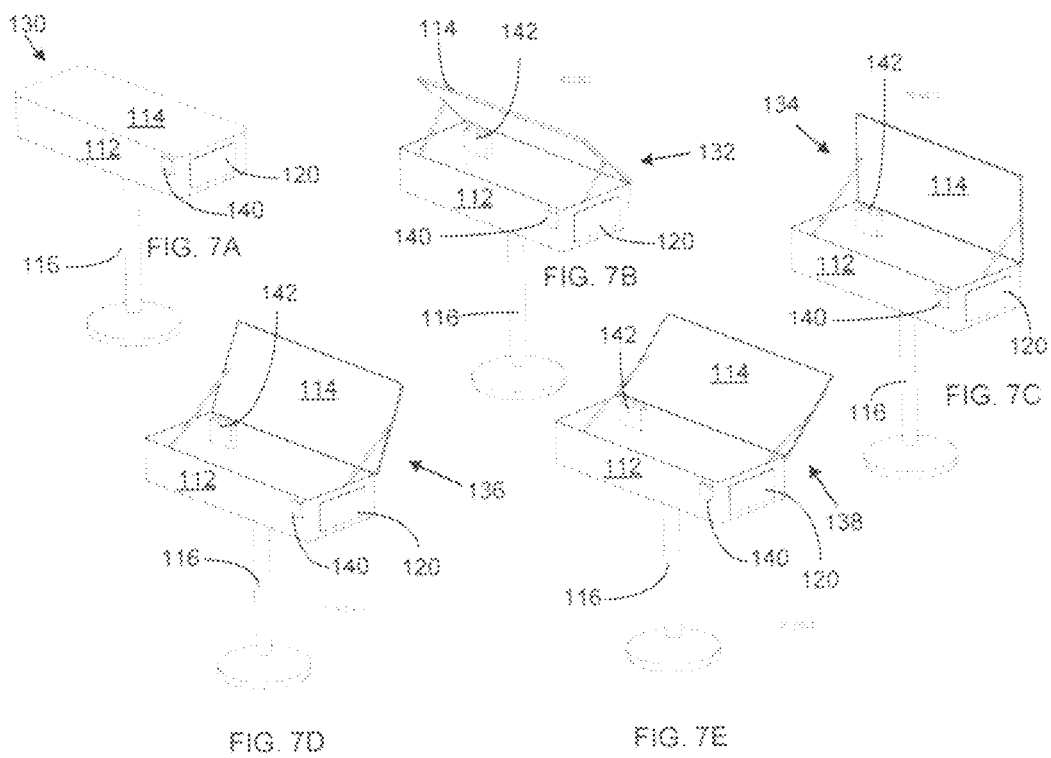

SYSTEM AND METHOD FOR ENHANCING DISTRIBUTION LOGISTICS AND INCREASING SURVEILLANCE RANGES WITH UNMANNED AERIAL VEHICLES AND A DOCK NETWORK

FIELD OF THE INVENTION

The present invention relates generally to a system and method for enhancing distribution logistics and increasing surveillance range with an unmanned aerial vehicle and a network of docks. More so, a system and method for enhancing distribution logistics and increasing surveillance range provides an unmanned aerial vehicle that remains in communication with a network of docks for enhancing distribution logistics of at least one package and increasing a surveillance range by enabling the unmanned aerial vehicle to communicate, park, and recharge with at least one dock while delivering the package to a destination point, obtaining the package from a pick up point, recharging the unmanned aerial vehicle throughout the network of docks, and increasing the range of the distribution and surveillance; wherein the unmanned aerial vehicle communicates with the dock, a pickup point, and a delivery point for maintaining efficient delivery, docking, and command instruction.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, drones are aircraft that do not have an on-board pilot and that are of limited autonomy. An unmanned aerial vehicle, commonly known as a drone, is an aircraft without a human pilot aboard. Its flight is controlled either autonomously by onboard computers or by remote control of a pilot on the ground or in another vehicle. This typical launch and recovery method of an unmanned aircraft is by function of an automatic system or an external operator on the ground.

In many instances, drones are used in numerous commercial and civil uses. Examples of the myriad, eclectic uses of drones, include: thermal or video camera imaging, to parcels delivery, farming, surveying of crops, acrobatic aerial footage in filmmaking, search and rescue operations, construction industry, inspecting power lines, dams, pipelines, counting wildlife, delivering medical supplies; to monitoring remote inaccessible regions, determining of illegal hunting by animal-rights advocates, livestock monitoring, weather imaging, all in real-time.

Often, electrically powered drones are limited in range and duration by the size and weight of the batteries which they carry. Batteries can make up a substantial percentage of the payload weight. Consequently, there is an inherent tradeoff between duration and useful payload. Because of these constraints, the flight times of electrically powered drones are typically limited to less than one hour. Additionally, the distance traveled from a base location is limited.

It is known that ordering a product over the Internet or through a mail order catalog is an effective technique for efficient purchases. However, shipping and receiving the product is often slow and sometimes, the product does not arrive. The coordination between the distributor and the recipient is not always optimal either. Experimental efforts at delivering the product by drones has been problematic, since the docking by the drone, and the loading/unloading of packages is slow and imperfect. For example, the docking station is not in communication with the drone. Or, the drone or packages are not visible once inside the docking station. The safety of the packages inside the docking station is also an issue.

Even though the above drone docking systems address some of the needs of the market, an unmanned aerial vehicle UAV that is in perpetual communication with a network of docks that are automated and controlled by logistical software is needed for delivering and picking up packages, and also for performing surveillance at extended ranges.

SUMMARY OF THE INVENTION

This invention is directed towards a system and method for enhancing distribution logistics and increasing surveillance range with an unmanned aerial vehicle and a network of docks. The system and method provides an unmanned aerial vehicle that remains in communication with at least one dock from a network of docks for enhancing distribution logistics of at least one package being delivered or picked up by the unmanned aerial vehicle. The system and method also enables the unmanned aerial vehicle to increase the range of surveillance in a surveillance area by recharging and receiving guidance from any of the docks at any time.

In one embodiment, the unmanned aerial vehicle delivery system, hereafter, "system" enables the unmanned aerial vehicle (UAV) to perform scheduled docking with at least one dock. From the dock, the UAV may deliver the package to a destination point, obtain the package from a pick up point, recharge the unmanned aerial vehicle throughout the network of docks, and increase the range of distribution and surveillance. The unmanned aerial vehicle is configured to communicate with the dock for efficient delivery, docking, and command instruction. In this manner, a synergy forms between the UAV and the network of docks that creates an efficient package delivery and surveillance ranges.

The UAV is defined by a propulsion portion that enables the UAV to fly, hover, and land. The UAV further includes a package storage portion that enables the UAV to pick up and drop off the package. The UAV may further include a docking portion that enables the UAV to engage the dock for parking and recharging. The UAV may include, without limitation, a drone, a helicopter, a propeller plane, and a hovercraft. In some embodiments, the UAV may utilize an onboard power source for operation. The onboard power source may include, without limitation, a rechargeable battery, an accumulator, an electrical battery, a fuel cell, and a fuel tank.

The UAV utilizes at least one dock in the network of docks to park, recharge, and receive maintenance. In one exemplary embodiment, the UAV picks up the at least one package from the dock and returns after completing delivery of the package to at least one delivery point. In another embodiment, the UAV leaves the dock empty, picks up the package from at least one pickup point, and then returns the package to the dock, or carries the package to a second delivery point. Both the delivery point and the pickup point may have a dock. However, in other embodiments, the UAV may deliver to a delivery point that does not have a dock. In this manner, efficient distribution of goods between companies, residential homes, and government organizations is possible. The delivery point and the pickup point may include, without limitation, a residential home, a retail store, a commercial warehouses, a governmental building, a central office for a package delivery organization, a warehouse, a fueling depot, and a maintenance garage. The device can be used for delivery and pickup in a vehicle to vehicle environment; stationary or in motion; land or waterborne vehicles.

The UAV performs deliveries of the at least one package through a network comprised of at least one dock, at least one initiation point, and at least one delivery point. The UAV flies between docks in an organized manner, using logistical software, commands from a package delivery organization, and guidance tools to coordinate the deliveries.

In one embodiment, the UAV parks in at least one dock amongst a network of docks. The dock is sized and dimensioned to contain the UAV and/or at least one package. The dock is defined by a housing having a cavity for storing the package and enabling the UAV to park. A door may regulate access to the cavity of the housing. The dock may be mounted on an elevated pedestal, or a secured wall or rooftop mount. A dock mount secures the dock at or proximal to the delivery point and the pickup point. For example, a pedestal mounted dock positions in front of a business, or on a roof of a house. However, in some embodiment, as for use in the surveillance capacity, the dock may be integrated into a vehicle, such as a bus, a boat, or a helicopter.

The system utilizes logistical software to control and monitor all aspects of the UAV and the network of docks. The logistical software is configured to coordinate various aspects of the UAV and delivery and pickup route, including, without limitation, the sequence of deliveries, the route taken by the UAV, permissions for the deliveries, mechanical condition and maintenance of the UAV, changes in the delivery route, and weather patterns. The UAV maintains wireless communication with the network of docks and a plurality of delivery points to enable a real time delivery, such that spontaneous changes to the delivery can be made.

In some embodiments, the dock may utilize wireless communication devices for communicating with the UAV and also for receiving commands from the delivery point or the pickup point. The wireless communication devices may include, without limitation, a wireless router, Wi-Fi towers, Bluetooth protocol, smart phones, and the Internet. The dock may also include a positioning system, such as a GPS. The positioning system enables the UAV to communicate with the network of docks for identifying the appropriate dock for pick up, delivery, or recharging.

The network of docks and the communication between them may be leveraged to increase the range of the UAV during deliveries, pickups, and surveillance. The network of docks may include a plurality of remote control range extending devices that enable an operator to increase the distance that the UAV travels between docks. The remote control range extending devices may be integrated into each dock in the dock network to form a remote control string of docks that control the UAV over the range of the dock network. As the UAV flies over the docks, the remote control range extending devices pass the UAV to the most proximal, such that the UAV is constantly tied into the wireless communication device of the nearest dock. Thus, the travel distance of the UAV is increased by orders of magnitude.

In some embodiments, the dock may include a motion detector. The motion detector senses the proximity of the UAV to open and close the door. The motion detector may also sense when the package is removed or added to the housing. In one exemplary use of the motion detector, the dock senses arrival and departure of the UAV. When the UAV requires departure from the housing, the door automatically opens and a landing pad extends outwards from the opening. When the motion detector senses the UAV returning, the door is opened. Upon landing, the landing pad is retracted. The door then closes, safely protecting the UAV from external factors that may damage the UAV. In one embodiment that provides security to the package and UAV inside the housing, the door is opened by a PIN code via a vendor, a customer, a smartphone app, the UAV, or front panel keypad. In one embodiment, the door to access the cavity of the housing is only opened by entering a PIN on the dock. This helps protect against unauthorized entry and access to the package and UAV.

In addition to the motion detector, a camera may be mounted on the housing of the dock. The camera may include an IP-addressable web camera that enables viewing of the UAV and the package. The camera may be configured to tilt, pan, retract, and extend, so as to obtain an optimal view. The camera is integrated into the wireless communication devices, such as the Internet. In this manner, the pickup point and the delivery point can receive visual notification about the status of the package. The dock can also view the UAV to check for damage or technical problems.

The dock may further include a plurality of light indicators that indicate the status of the dock, the package, and the UAV. The plurality of light indicators may include a series of LED's, including a green LED, a yellow LED, and a red LED. In one exemplary embodiment, the green LED illuminates when the package has been delivered. The red LED illuminates when the dock is inoperable or the housing is full of packages and cannot receive more. In some embodiments, the dock comprises a dock battery that may be replenished through A/C wiring from a home or business power outlet, or through a D/C from a battery or via solar recharging In some embodiments, the method for enhancing distribution logistics with an unmanned aerial vehicle and a network of docks enables efficient distribution of goods and services between companies, residential homes, and government organizations. The method includes an initial Step of providing a dock for a recipient, the dock defined by a unique dock identification, the dock configured to receive at least one package from an unmanned aerial vehicle. The recipient may include a residential house, a business, and a governmental organization. The dock may be mounted externally or internally on a delivery point or pickup point. The recipient utilizes the dock to send and receive at least one package of a product.

The method may further comprise a Step of registering with a distributor, by a recipient, personal information, financial information, and a unique dock identification for the dock. The distributor may include a vendor, a government agency, and a consumer. The recipient provides the personal information and the financial information for transacting a purchase of the product. The recipient provides the unique dock identification for the dock as an address for the UAV to communicate with the dock, and thereby deliver the product.

A Step includes selecting, by the recipient, a product to purchase. The product may include any product known in the commercial industry that can be carried by the UAV. The selected product may even include large, heavy products, such as vehicles or building materials. Though in other embodiments, mail, liquids, and containers of a gas may also be delivered.

In some embodiments, a Step comprises packaging, by a distributor, the selected product for delivery to the consumer. The distributor finds the selected product in a storage unit and prepares the product for shipping. This may include packaging the product to minimize damage and for loading onto the UAV. A Step includes loading the selected product in an unmanned aerial vehicle. The UAV is defined by a docking portion, a propulsion portion, and a package storage portion. The package storage portion is configured to receive the packaged product. The package storage portion may include, without limitation, a chute, a clamp, and a magnet.

In some embodiments, a Step may include programming the unmanned aerial vehicle with the unique dock identification provided by the recipient. A logistical software commands the UAV to fly to the exact position of the unique dock identification. The dock comprises a positioning system, such as a GPS, to help guide the UAV to the correct dock. An additional Step comprises notifying the recipient that the product is arriving. The recipient is automatically notified by email, text, or phone call that the product is arriving and the approximate arrival time.

A Step includes communicating, by the unmanned aerial vehicle and/or the distributor, with the dock to accept the product. A wireless communication device in the dock enables this wireless communication. In one possible embodiment, the UAV flies to the delivery point and signals to the dock to open a door. Though, the distributor may also actuate the door to open remotely through the logistical software. After delivering the product, the UAV returns to the distributor or to a second delivery point. The door on the dock closes and security is reset accordingly. A final Step comprises indicating, by the unmanned aerial vehicle and/or the distributor, that the product is delivered. The recipient is automatically notified by email, text, or phone call that the product has been deposited into the dock. In one embodiment, a visible receipt is left on the dock to indicate that the product has been delivered. Security is enabled via a PIN (Personal Identification Number); depending on function desired the PIN may be entered via transmission by Internet by customer or vendor, by the drone itself, or, via a front panel keypad.

One objective of the present invention is to utilize an energy efficient UAV to perform delivery of packages and extended range surveillance.

Another objective is to provide increase the range of the unmanned aerial vehicle by providing recharging points throughout the network of docks.

Another objective is to provide control and operate the UAV and delivery route with a logistical software that coordinates the sequence of deliveries, the route taken by the UAV, permissions for the deliveries, mechanical condition and maintenance of the UAV, changes in the delivery route, and weather patterns.

Yet another objective is to enable the package recipient to communicate with the UAV for real time control of the delivery.

Yet another objective is to enable a distributor or a package delivery organization to create a cost efficient delivery system.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which:

FIG. 1A illustrates a dock, FIG. 1B illustrates the door moving to an open position and an exemplary unmanned aerial vehicle delivering at least one package, and FIG. 1C illustrates the package delivered and the unmanned aerial vehicle returning to a home dock, in accordance with an embodiment of the present invention;

FIG. 6A illustrates the unmanned aerial vehicle leaving the dock for extended range surveillance in a surveillance area, and FIG. 6B illustrates the unmanned aerial vehicle docking from a watercraft, in accordance with an embodiment of the present invention;

FIGS. 7A, 7B, 7C, 7D, and 7E are perspective views of an exemplary dock, showing the door moving from a closed position to an open position, where FIG. 7A illustrates the closed position, FIG. 7B illustrates the door open at 45°, FIG. 7C illustrates the door open at 90°, FIG. 7D illustrates the door open at 115°, and FIG. 7E illustrates the door in the fully open position at 135°, in accordance with an embodiment of the present invention;

Like reference numerals refer to like parts throughout the various views of the drawings.

DETAILED DESCRIPTION OF THE INVENTION

Figure 1:
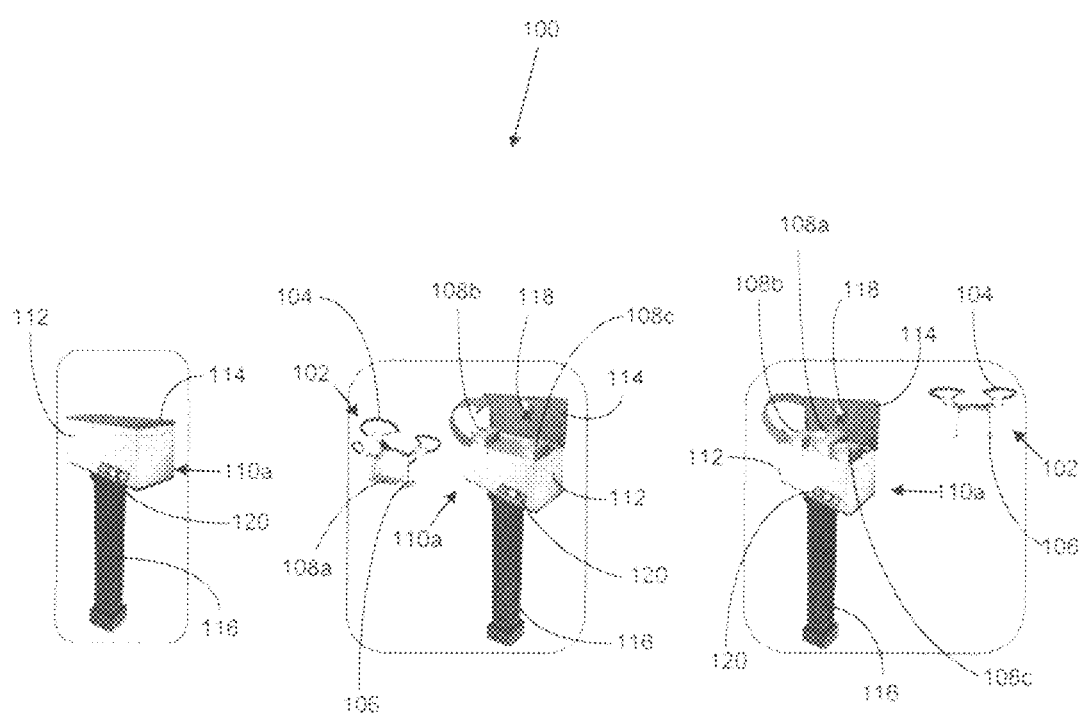
FIGS. 1A, 1B, and 1C are perspective view of an exemplary system for enhancing distribution logistics and increasing surveillance range with an unmanned aerial vehicle and a network of docks, where

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1 Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIGS. 1-12 illustrate a system 100 and method 200 for enhancing distribution logistics for at least one package 108a-c and increasing the surveillance range of a surveillance area 128. The system 100 and method 200 provides an unmanned aerial vehicle 102 that performs package delivery and surveillance duties while maintaining communication with at least one dock 110a-c in a network of docks. The system 100 and method 200 enables enhanced distribution logistics of at least one package 108a-c that is delivered or picked up by the unmanned aerial vehicle 102 through the use of logistical software. Further, the system 100 and method 200 enables the unmanned aerial vehicle 102 to increase the range of surveillance by leveraging the network of docks 110a-c with a plurality of remote control range extending devices 148 and a wireless communication device 144. The surveillance embodiment will include motion sensor/infrared capability so the unmanned aerial vehicle 102 may automatically launch and begin unmanned camera-enabled patrol of designated area. The system 100 would simultaneously notify human operator of automated launch to begin human controlled operation and observation.

The unmanned aerial vehicle delivery system 100, hereafter, "system 100" enables the unmanned aerial vehicle 102 (UAV) to perform scheduled docking with at least one dock 110a-c. From the dock 110a-c, the UAV 102 may deliver the package 108a-c to at least one delivery point 124a-b, obtain the package 108a-c from at least one pickup point 122a-b, recharge the UAV 102 throughout the network of docks 110a-c, and increase the range of distribution and surveillance. In this manner, a synergy forms between the UAV 102 and the network of docks 110a-c that creates efficient package delivery and extended surveillance ranges.

The UAV 102 may include, without limitation, a drone, a helicopter, a propeller plane, and a hovercraft. The UAV 102 is defined by a propulsion portion 104 that enables the UAV 102 to fly, hover, and land. The propulsion portion 104 may include a rotor and a blade, a jet engine, and a propeller. The UAV 102 further includes a package storage portion 106 that enables the UAV 102 to pick up and drop off the at least one package 108a-c. The package storage portion 106 is configured to receive the package 108a-c from the UAV 102 at the pickup point 122a-b, store the package 108a-c during the delivery route, and unload the package 108a-c in the dock 110a-c at the delivery point 124a-b. The package storage portion 106 may be configured to receive variously sized and dimensioned packages 108a-c. The package storage portion 106 may include a chute, a clamp, a magnet, and an adhesive. Some examples of the package 108a-c may include, without limitation, a book, an auto part, food, videos, medicine, postal mail, fast food, an electronic device, an animal, and a contained gas or liquid.

In some embodiments, the UAV 102 further comprises a surveillance portion that enables the UAV 102 to monitor a predetermined range. The UAV 102 may further include a docking portion that enables the UAV 102 to engage the dock 110a-c for parking and recharging. In some embodiments, the UAV 102 may utilize an onboard power source (not shown) for operation. The onboard power source may include, without limitation, a rechargeable battery, an accumulator, an electrical battery, a fuel cell, and a fuel tank. The onboard power source may be recharged through a dock battery 142 in each of the docks 110a-c. Though in some embodiments, a solar panel may be used to power the dock 110a-c and recharge the UAV 102.

The UAV 102 performs deliveries of the at least one package 108a-c through a network comprised of at least one dock 110a-c, at least one pickup point 122a-b, and at least one delivery point 124a-b. The UAV 102 flies between docks in an organized manner, using logistical software, commands from the pickup point 122a-b and delivery point 124a-b, and a guidance system to coordinate the deliveries.

In some embodiments, a distributor 152, a consumer, the delivery point 124a-b, the pickup point 122a-b, and even the UAV 102 itself may initiate the delivery or pickup of the at least one package 108a-c. The delivery may commence in three instances: 1) upon the UAV 102 sending a delivery command, 2) upon a distributor 152 sending a deliver command, or 3) upon a recipient 154 sending a deliver command. The command may be sent through a transaction device 156, such as an Internet, smart phone software applications, Bluetooth, or Wi-Fi. The details of the delivery command are deciphered by a logistics software, discussed below.

FIGS. 1A, 1B, and 1C illustrate a logistical delivery configuration in which the UAV 102 delivers at least one package 108a-c to a dock 110a-c at a delivery point 124a-b. In this exemplary embodiment, the UAV 102 picks up the package 108a-c from a pickup point 122a-b. The UAV 102 transports the package 108a-c to the dock 110a at the delivery point 124a-b and returns to the pickup point 122a-b or another dock 110b after completing delivery of the package 108a-c. FIG. 1A illustrates the dock 110a. FIG. 1B illustrates the dock 110a having a housing 112 and a door 114 that regulates access to a cavity in the housing 112. The door 114 is in an open position 130 to receive the package 108a-c. FIG. 1C illustrates the package 108a-c delivered and the UAV 102 returning to the pickup point 122a-b or to a second dock 110b for further pickups and deliveries. In this example, the UAV 102 leaves the dock 110a empty, picks up the package 108a from a first pickup point 122a, and then returns the package 108a to the dock 110b, or to a second delivery point 124b. In one embodiment that provides security to the package 108a and UAV 102 inside the housing 112, the door 114 is opened by a PIN code via a vendor, a customer, a smartphone app, the UAV 102, or front panel keypad. In one embodiment, the door 114 to access the cavity of the housing 112 is only opened by entering a PIN on the dock 110*a*. Though the PIN may also be entered remotely from a software app. This helps protect against unauthorized entry and access to the package 108*a* and UAV 102.

Figure 2:
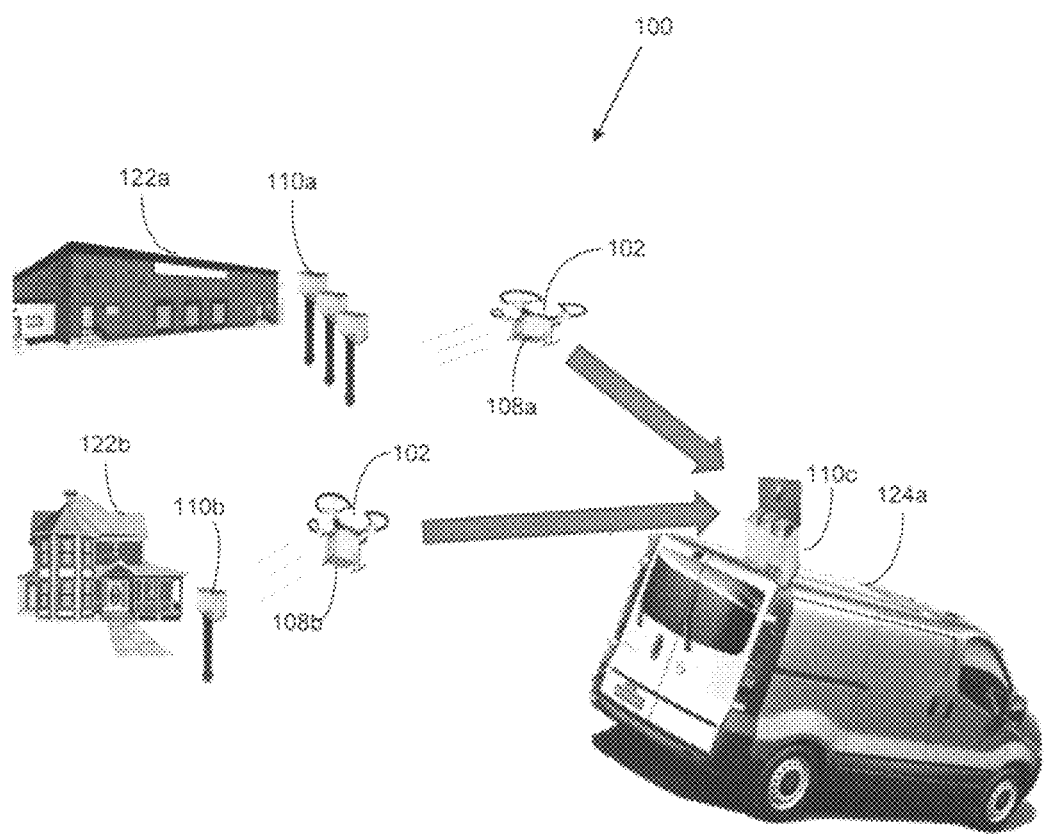
FIG. 2 illustrates a perspective view of the unmanned aerial vehicle delivering the package from at least one pickup point to a moving land or waterborne vehicle, in accordance with an embodiment of the present invention.

In one possible embodiment, both the delivery point 124*a*-*b* and the pickup point 122*a*-*b* may have a dock 110*a*-*c*. However, in other embodiments, the UAV 102 may deliver to a delivery point 124*a*-*b* that does not have a dock 110*a*-*c*. The delivery point 124*a*-*b* and the pickup point 122*a*-*b* may include, without limitation, a residential home, a retail store, a commercial warehouses, a governmental building, a central office for a package 108*a*-*c* delivery organization, a warehouse, a fueling depot, and a maintenance garage or a land or waterborne vehicle FIG. 2 illustrates yet another logistical delivery configuration. In this embodiment, the delivery point 124*a*-*b* is a mobile land vehicle. Multiple UAV's 102 deliver the packages 108*a*-*b* from the dock 110*a*-*b* at different pickup points 122*a*-*b* to the delivery point 124*a* on the land vehicle. The dock 110*c* may be secured externally to the land vehicle to further facilitate loading and unloading of the package 108*a*. Because the UAV 102 has the capacity to fly, delivering to a land vehicle is more feasible. However, the same logistical delivery configuration could be applied to deliveries to a watercraft 160 or helicopter.

Figure 3:
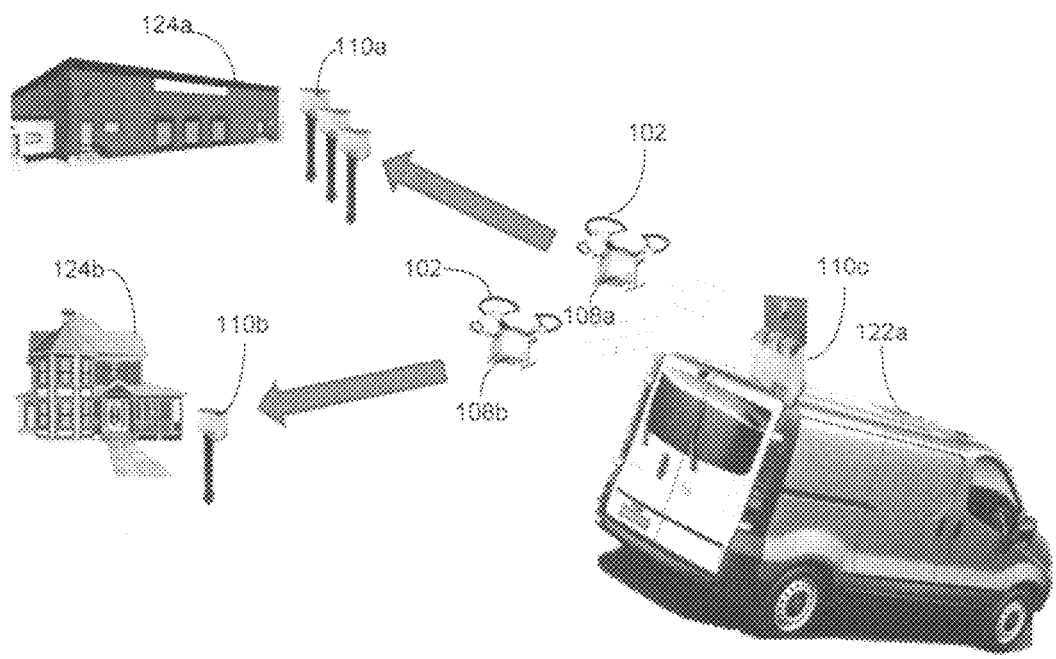
FIG. 3 illustrates a perspective view of the unmanned aerial vehicle delivering the package from the moving land or waterborn vehicle to at least one delivery point, in accordance with an embodiment of the present invention.
Figure 4:
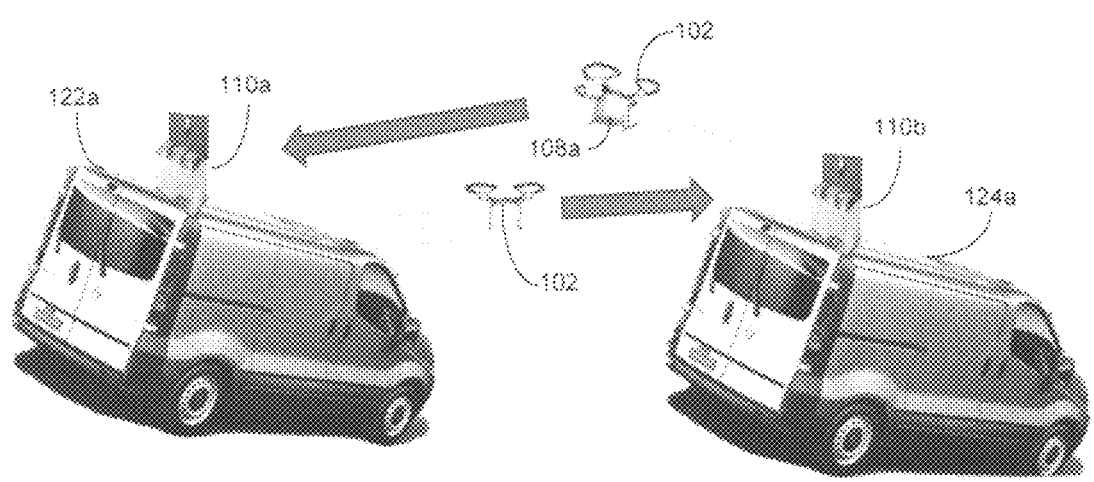
FIG. 4 illustrates a perspective view of the unmanned aerial vehicle delivering the package between two moving land or waterborn vehicle, in accordance with an embodiment of the present invention.

FIG. 3 illustrates yet another logistical delivery configuration. In this embodiment, the above mentioned delivery to the land vehicle is reversed. The UAV 102 picks up the packages 108*a*-*b* from a moving land vehicle and delivers the packages 108*a*-*b* to multiple docks 110*a*-*b* at businesses, residences, governmental organizations, etc. FIG. 4 illustrates yet another logistical delivery configuration in which the UAV 102 transports the package 108*a* between multiple moving land vehicles. This configuration is especially effective in increasing the delivery combinations for distribution logistics. In this embodiment, either one or both of the land vehicles may command the UAV 102 to perform the delivery. And either land vehicle can serve as the pickup point 122*a* or the delivery point 124*a*.

Figure 5:
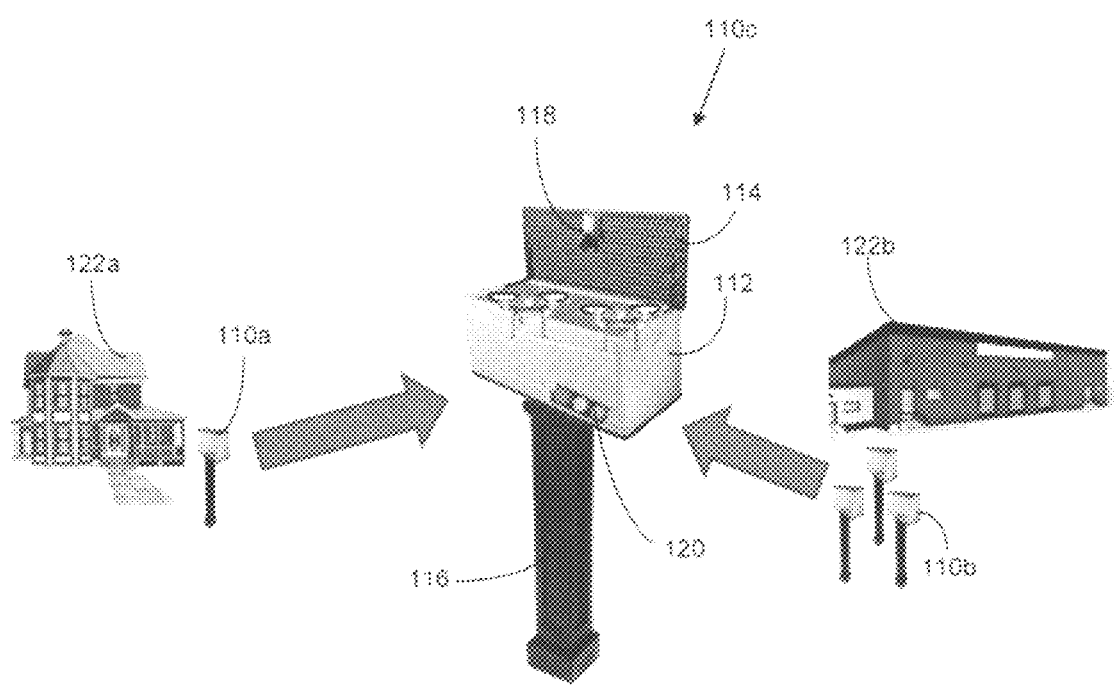
FIG. 5 illustrates a perspective view of the unmanned aerial vehicle delivering returning to a home dock for storage, recharging, and maintenance, in accordance with an embodiment of the present invention.
Figures 6A, 6B:
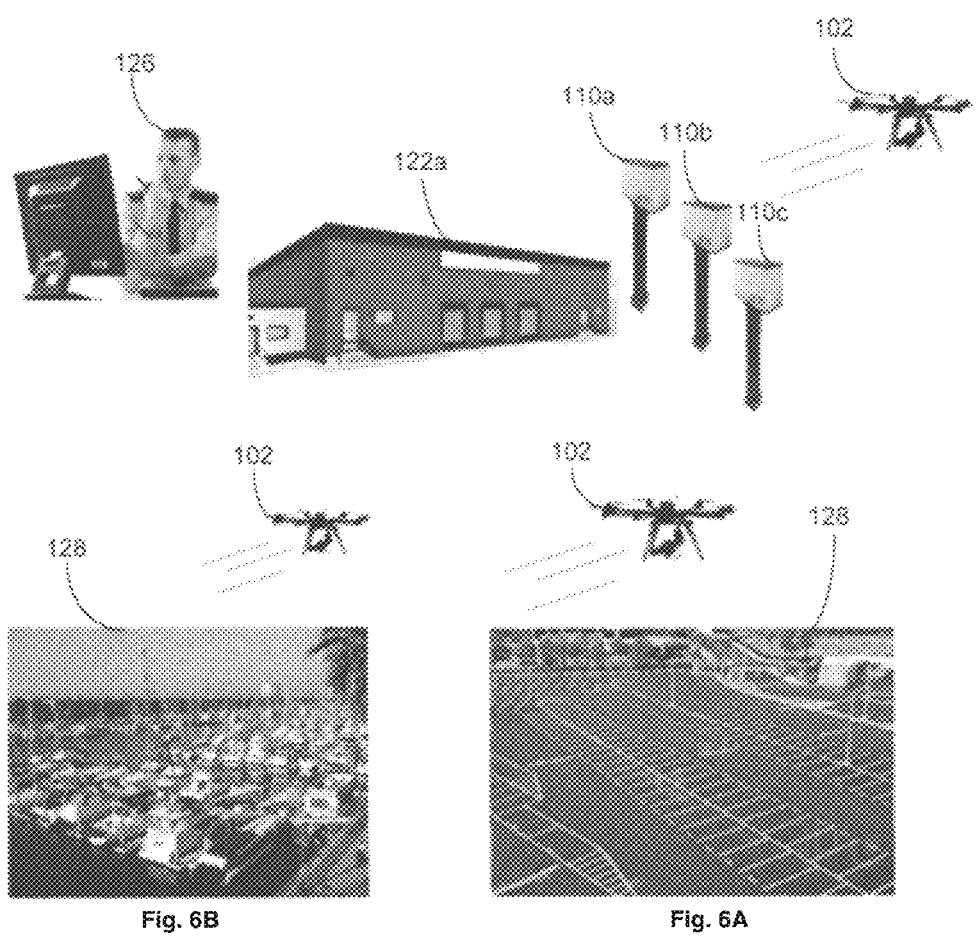
FIGS. 6A and 6B illustrate perspective views of an aerial unmanned vehicle operating, where

As illustrated in FIG. 5, the UAV 102 may return to a home dock 110*c* for storage, recharging, and maintenance, and review of surveillance camera footage. The dock 110*c* provides a dry, monitored environment that protects the UAV 102 and prepares the UAV 102 for future deliveries and pickups. The dock 110*c* also recharges the UAV 102, as discussed below. Multiple UAV's 102 may be stored in the same dock 110*c*. FIG. 6A illustrates an embodiment in which the UAV 102 utilizes the at least one dock 110*a*-*c* as a launching pad for extended range surveillance. A motion detector 140 is configured to detect unauthorized movement in a predetermined surveillance area 128. The movement triggers the dock 110*a*-*c* to launch the UAV 102 to monitor the surveillance area 128. An external surveillance monitor 126 may view the monitoring of the surveillance area 128 through the surveillance portion, i.e., long range surveillance camera, on the UAV 102. This can especially be useful in border control duties. The UAV 102 may utilize infrared technology to enhance monitoring during the night or in inclement weather. The infrared may also be used to locate the dock 110*a* for landing.

In one embodiment, the UAV 102 parks in at least one dock 110*a* amongst a network of docks 110*a*-*c*. The dock 110*a* is sized and dimensioned to contain the UAV 102 and/or the at least one package 108*a*-*c*. The dock 110*a*-*c* is defined by a housing 112 having a cavity for storing the package 108*a*-*c* and enabling the UAV 102 to dock, recharge, and maneuver for loading and unloading the package 108*a*-*c*. A door 114 may regulate access to the cavity in the housing 112. The UAV 102 may also be used with a watercraft 160, as shown in FIG. 6B. In this embodiment, the dock 110*a* provides a platform on the watercraft 160 for the UAV 102 to film watersport activities, i.e., water skiing, jet skiing, wake boarding, etc. Further, from the watercraft 160, the UAV 102 could be launched from the dock 110*a* for search and rescue operations. This would allow a camera-equipped UAV 102 to monitor inaccessible waterways or swampy areas. The UAV 102 could also be used to extend the range of a water search by flying ahead of the watercraft 160.

In one embodiment, shown in FIGS. 7A-7E, the door 114 is hinged. The door 114 may move between a closed position 130 and an open position 138. The door 114 opens incrementally, depending on the size of the package 108*a*-*c* and the orientation of the UAV 102 while picking up or delivering the package 108*a*. As shown in FIGS. 7A-7E, the door 114 is in a closed position 130. The closed position 130 remains securely locked until the door 114 is actuated to the open position 138. From the closed position 130, the door 114 may open up to about 45° opening 132. If this is insufficient, the door 114 may open to a 90° opening 134. The door 114 can open even further, to a 115° opening 136. Finally, the door 114 moves to an open position 138 of about 135°. The fully open position 138 is effective for receiving or loading an exceptionally large package 108*a*-*c* and for performing maintenance inside the housing 112.

Figures 8, 9:
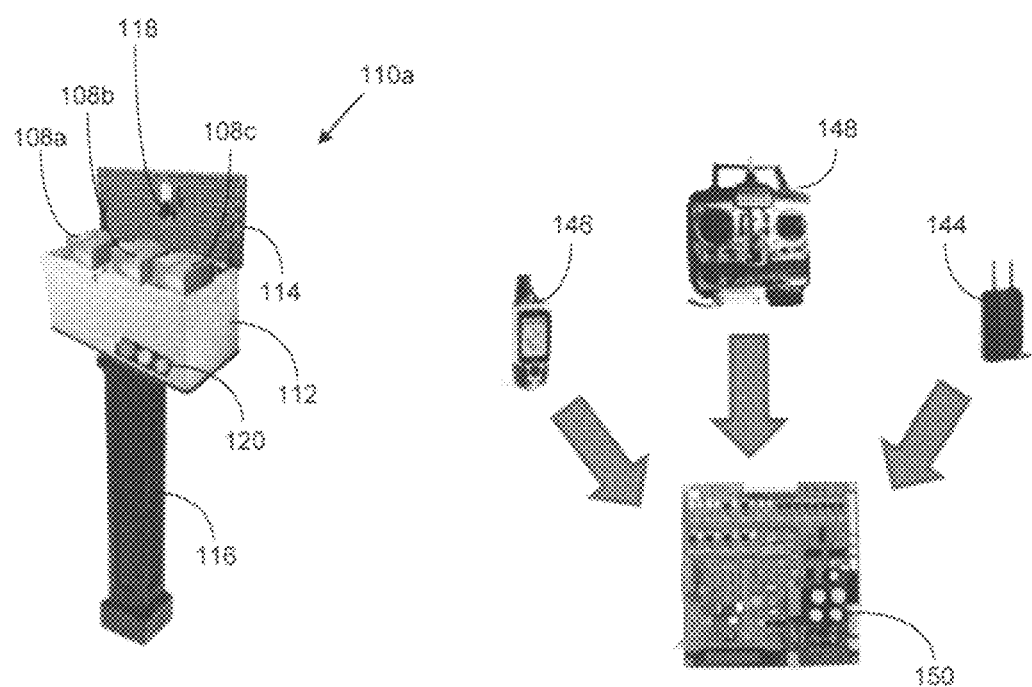
FIG. 8 illustrates a perspective view of the dock with the door in the open position and at least one package stored inside the housing, in accordance with an embodiment of the present invention.
FIG. 9 illustrates a perspective view of an exemplary positioning system, an exemplary wireless communication device, and an exemplary remote control range extending device integrating into an exemplary motherboard, in accordance with an embodiment of the present invention.
Figure 10A:
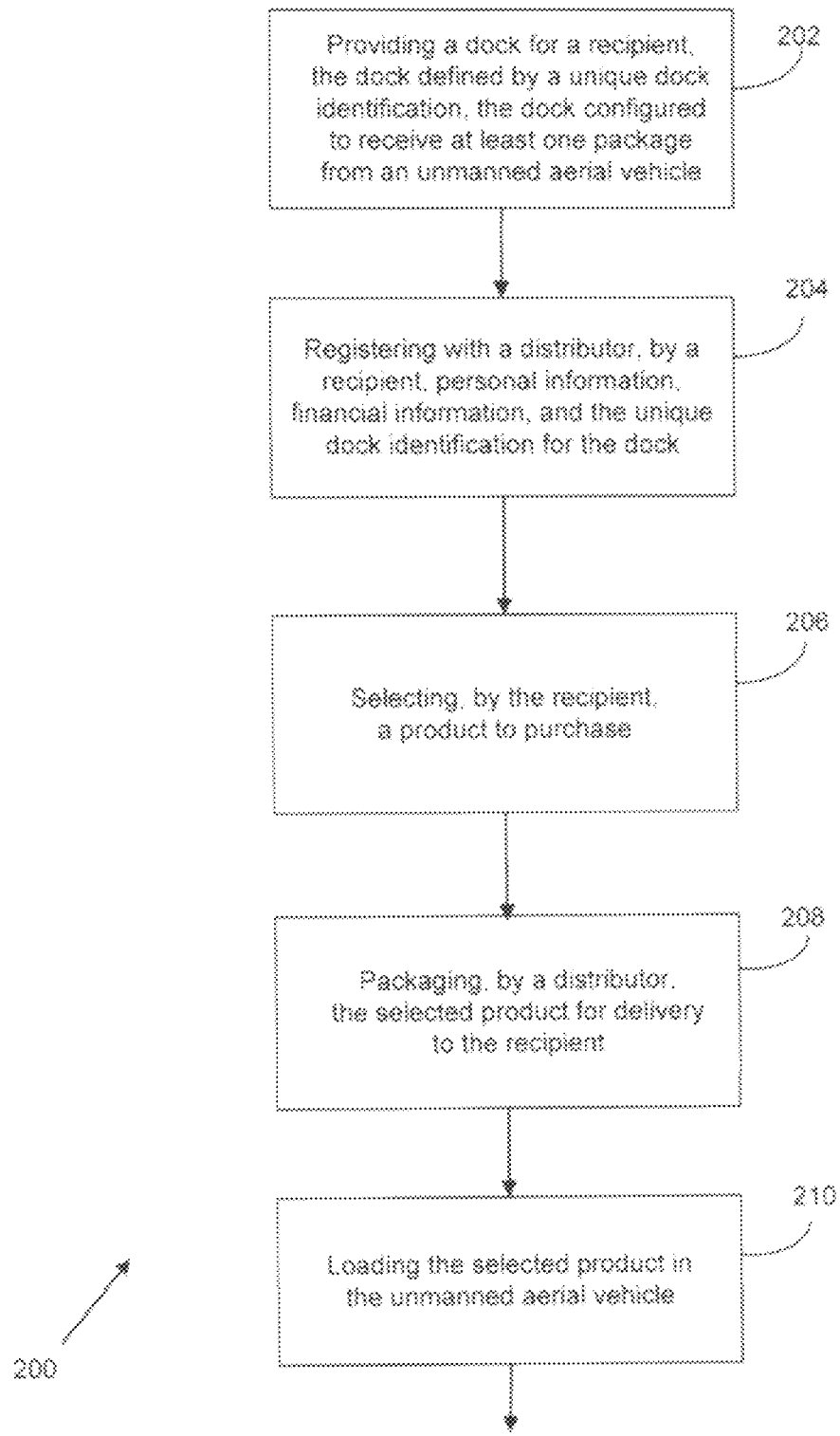
FIGS. 10A and 10B illustrate flowchart diagrams of an exemplary method for enhancing distribution logistics and increasing surveillance ranges with an unmanned aerial vehicle and a network of docks, in accordance with an embodiment of the present invention.
Figure 10B:
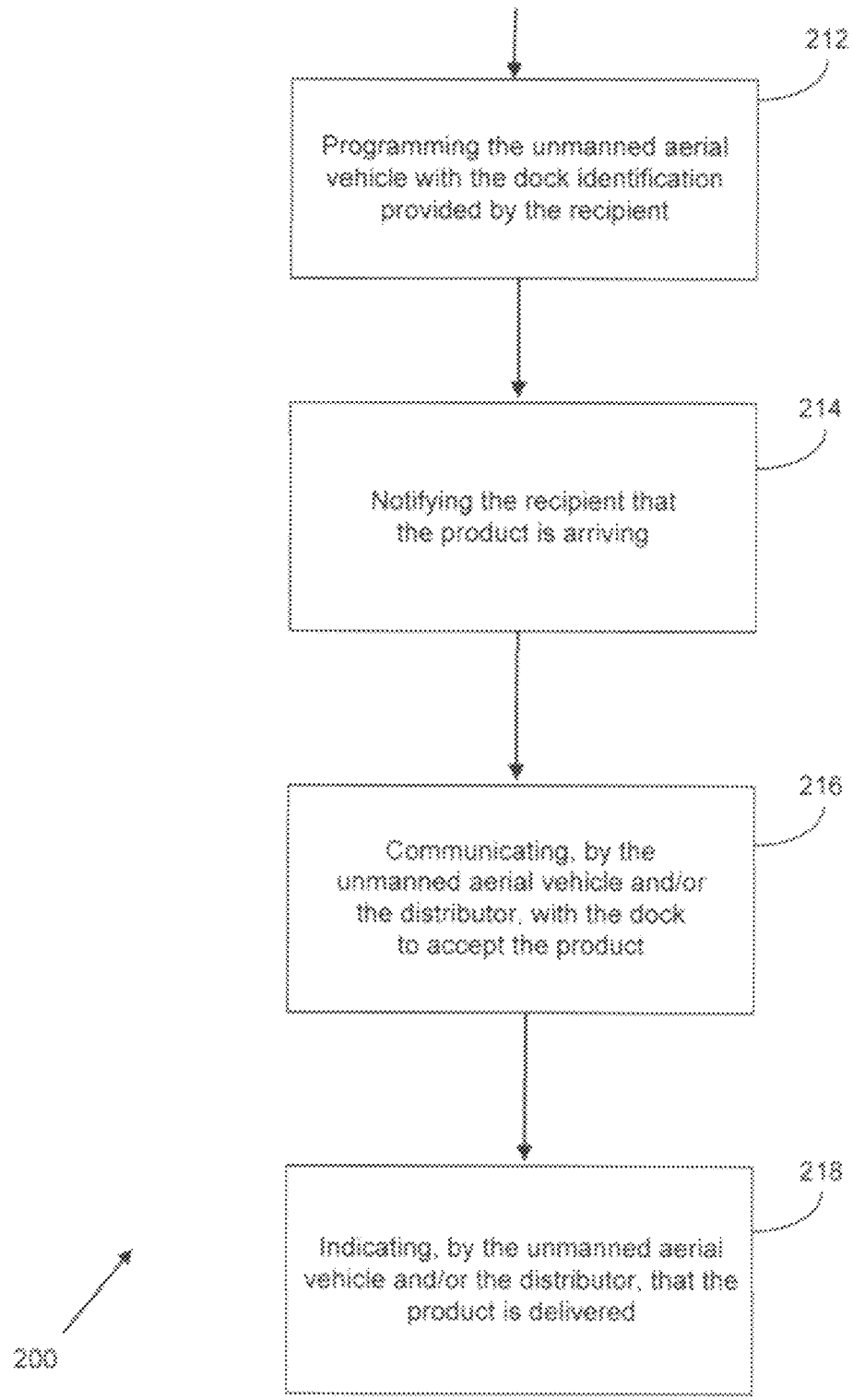

As illustrated in FIG. 8, the dock 110*a*-*c* mounts on a dock mount 116. The dock mount 116 may include an elevated pedestal, or a secured wall or rooftop mount. The dock mount 116 secures the dock 110*a*-*c* at or proximal to the delivery point 124*a*-*b* and the pickup point 122*a*-*b*. For example, a pedestal mounted dock 110*a*-*c* positions in front of a business, or on a roof of a house. Those skilled in the art, in light of the present teachings, will recognize that the height of the dock 110*a*-*c* may be dependent on air flight regulations. For example, in congested areas, aircraft, such as the UAV 102, may be required to stay 1,000 feet higher than any obstacle, such as the dock 110*a*-*c*, within a 2,000 feet radius of the UAV 102. However, in noncongested, sparsely populated areas, or over bodies of water, the UAV 102 must remain at least 500 feet from the dock 110*a*-*c*. Nonetheless, the dock 110*a*-*c* does have regulated air rights that enable the UAV 102 to engage the dock 110*a*-*c*.

However, in some embodiment, as for use in the surveillance capacity, the dock 110*a*-*c* may be integrated into a vehicle, such as a bus, a boat, or a helicopter. The elevated pedestal provides numerous advantages for the UAV 102 to access the dock 110*a*-*c*. The elevated delivery points 124*a*-*b* and pickup points 122*a*-*b* enable the UAV 102 to provide a more efficient delivery by avoiding ground routes and delivering directly to elevated structures, which are generally easier to access than a dock 110*a* on a ground surface.

In some embodiments, the system 100 may utilize a logistical software to control and monitor all aspects of the UAV 102 and the network of docks 110*a*-*c*. The logistical software is configured to coordinate various aspects of the UAV 102 and delivery and pickup route, including, without limitation, the sequence of deliveries, the route taken by the UAV 102, permissions for the deliveries, mechanical condition and maintenance of the UAV 102, changes in the delivery route, and weather patterns. The logistical software enables the UAV 102 to maintain wireless communication with the network of docks 110*a-c*. The logistical software also enables real time delivery, such that spontaneous changes to the delivery can be made, even if the UAV 102 has left the pickup point 122*a* with the package 108*a*. In some embodiments, a software application may be integrated into the software logistics. The software application is downloaded onto a mobile communication device. The mobile communication device uses the software app to relay messages to and from the wireless communication device 144*a* and guidance system on the UAV 102. Thus, through the mobile communication device, the UAV 102 may be tracked and controlled.

In one possible embodiment, the logistical software comprises a guidance system 100. The guidance system 100 helps navigate the UAV 102 on the delivery route to the appropriate dock 110*a-c*. In one embodiment, the guidance system 100 has a remote sensing mechanism that guides the UAV 102 to the dock 110*a-c*. The remote sensing mechanism may include, without limitation, electromagnetic spectrum sensors, gamma ray sensors, biological sensors, and chemical sensors. In one embodiment, the UAV 102 utilizes electromagnetic sensors having visual spectrum, infrared, or near infrared cameras as well as radar systems that enable a remote operator to view the route taken by the UAV 102. This equipment may especially be effective for performing surveillance at night.

In one alternative embodiment, the system 100 provides a more efficient logistical network of deliveries by enabling the UAV 102 to replenish its power source at any of the delivery point 124*a-bs*, and thus negates the need to return to the initiation point to replenish the power source. This is possible because each dock 110*a-c* has its own dock battery 142 that powers the onboard power source of the UAV. Though in some embodiments, a solar panel may be used to power the dock 110*a-c*.

In yet another alternative embodiment, the logistical software may also provide logistical accounting to confirm deliveries made to a recipient 154 without requiring the recipient 154 to be present. Consequently, because of the instant confirmation and the security afforded by the dock 110*a-c*, there is not a need for multiple delivery attempts when the recipient 154 is not present.

In some embodiments, the dock 110*a-c* may utilize a wireless communication device 144 for communicating with the UAV 102 and also for receiving commands from the delivery point 124*a-b* or the pickup point 122*a-b*. The wireless communication device 144 may include, without limitation, a wireless router, Wi-Fi towers, Bluetooth protocol, smart phones, and the Internet. The dock 110*a-c* may also include a positioning system 146, such as a GPS. The positioning system 146 enables the UAV 102 to communicate with the network of docks 110*a-c* for identifying the appropriate dock 110*a-c* for pick up, delivery, or recharging.

In some embodiments, the system 100 may utilize a downloadable software application. The downloadable software application is configured to receive notification when the unmanned aerial vehicle is proximal to the at least one dock 110*a-c*. The downloadable software application is further configured to receive notification when the at least one package 108*a-c* is present in the housing 112 of the at least one dock 110*a-c*. The downloadable software application may be downloaded by a consumer on a smart phone, tablet, or computer for monitoring the status of a delivery. In another exemplary embodiment, the downloadable software application may be downloaded by a monitoring party for notifications about the status of surveillance or when a predetermined range for the UAV 102 is exceeded.

The UAV 102 may leverage the network of docks 110*a-c* to increase the range of the UAV 102 for surveillance, deliveries, and pickups. The network of docks 110*a-c* may include a plurality of remote control range extending devices 148 that enable the UAV 102 to have an increased range as it travels between multiple docks 110*a-c*. The remote control range extending devices 148 may be integrated into each dock 110*a-c* in the dock network. This forms a remote control chain of docks 110*a-c* that control the UAV 102 over the range of the dock network.

For example, as the UAV 102 flies over a proximal dock 110*a*, it remains in contact with this dock 110*a*. As the UAV 102 leaves the range of the dock 102*a* and into the range of a second dock 110*b*, the remote control range extending device 148 passes the UAV 102 to the second dock 110*b*, such that the UAV 102 is constantly tied into the wireless communication device 144 of the most proximal dock 110*a-c*. Thus, the travel distance of the UAV 102 is increased by orders of magnitude.

In another exemplary mode of operation, a first remote control range extending device at a first dock 110*a* is the most proximal dock 110*a* to the UAV 102. The first remote control range extending device controls the guidance of the UAV 102. As the UAV 102 leaves the range of the first remote control range extending device and flies in the range of a more proximal second dock 110*b*, a second remote control range extending device takes control of the UAV 102 for guiding towards the appropriate dock 110*a-c*.

FIG. 9 illustrates one possible circuitry configuration for the dock 110*a-c*, in which the positioning system 146, the wireless communication device 144, and a range extending device 148 of the plurality of remote control range extending devices 148 are integrated into a motherboard 150. The housing 112 provides a moisture proof seal to protect the motherboard 150 and other circuitry from damage by external elements or heat generated by the UAV 102.

In some embodiments, the dock 110*a-c* may include a motion detector 140. The motion detector 140 senses the proximity of the UAV 102 to trigger opening and closing of the door 114, as needed. The motion detector 140 may also sense when the package 108*a-c* is removed or added to the housing 112. In one exemplary use of the motion detector 140, the dock 110*a-c* senses arrival and departure of the UAV 102. When the UAV 102 requires departure from the housing 112, the door 114 automatically opens and a landing pad extends outwards from the opening. When the motion detector 140 senses the UAV 102 returning, the door 114 is opened. Upon landing, the landing pad is refracted. The door 114 then closes, safely protecting the UAV 102 from external factors that may damage the UAV 102.

In yet another use of this detecting capacity of the dock 110*a-c*, the motion detector 140 is configured to sense unauthorized movement in a predetermined surveillance area 128. This external movement triggers the dock 110*a-c* to launch the UAV 102 to monitor the surveillance area 128. An external surveillance monitor 126 may view the long range monitoring by the UAV 102 through the surveillance portion, i.e., long range camera 118, of the UAV 102. This can especially be useful in border control duties.

In some embodiments, a camera 118 may be mounted on the door 114 of the housing 112 for the dock 110*a-c*. The camera 118 may be configured to tilt, pan, retract, and extend, so as to obtain an optimal view. The camera 118 is integrated into the wireless communication device 144, such as the Internet. In this manner, the pickup point 122*a-b* and the delivery point 124*a-b* can receive visual notification about the status of the package 108*a-c*. The dock 110*a-c* can also view the UAV 102 to check for damage or technical problems. In one possible embodiment, the camera 118 may include an IP-addressable web camera that enables viewing of the UAV 102 and the at least one package 108*a-c*.

The external, visible area on the housing 112 of the dock 110*a-c* may further include a plurality of light indicators 120 that indicate the status of the dock 110*a-c*, the package 108*a-c*, and the UAV 102. The plurality of light indicators 120 may include a series of LEDs, including a green LED, a yellow LED, and a red LED. In one exemplary embodiment, the green LED illuminates when the package 108*a-c* has been delivered. In another embodiment, the red LED illuminates when the dock 110*a-c* is inoperable or the housing 112 is full of packages 108*a-c* and cannot receive more.

In some embodiments, the dock 110*a-c* comprises a dock battery 142 that may be replenished through A/C wiring from a home or business power outlet, or through a D/C from a battery or through automated solar recharging. The dock battery 142 powers the dock 110*a-c* and also enables the UAV 102 to replenish power. The capacity to replenish the onboard power source of the UAV 102 at the dock 110*a* in the network enables an increased range of delivery routes for the UAV 102 since the UAV 102 does not have to return to a home base dock 110*a-c* or recharging dock before continuing on the delivery route. This enhances logistics of the system 100 and increases efficiency for the delivery. In one embodiment, the UAV 102 can replenish the onboard power source at any dock 110*a-c* in the network irrespective of whether a package 108*a-c* is being delivered or not. In this manner, the range of the UAV 102 is expanded by leveraging the network of docks 110*a-c*. Though in some embodiments, a solar panel may be used to power the dock 110*a-c*.

In operation, the method 200 for enhancing distribution logistics in commercial transactions with a UAV 102 and a network of docks 110*a-c*. The method 200 is effective for enabling efficient distribution of at least one product 158 between companies, residential homes, and government organizations. As shown in the flowchart diagrams of FIGS. 10A and 10B, the method 200 includes an initial Step 202 of providing a dock 110*a-c* for a recipient 154, the dock 110*a-c* defined by a unique dock identification, the dock 110*a-c* configured to receive at least one package 108*a-c* from an unmanned aerial vehicle. The recipient 154 may include a residential house, a business, and a governmental organization. The dock 110*a-c* may be mounted externally or internally on a delivery point 124*a-b* or pickup point 122*a-b*. The recipient 154 utilizes the dock 110*a-c* to send and receive at least one package 108*a-c* of the product 158. Each dock 110*a-c* has a unique dock identification to help the UAV 102 identify the appropriate dock 110*a-c* for pickup or delivery.

The method 200 may further comprise a Step 204 of registering with a distributor 152, by a recipient 154, personal information, financial information, and a unique dock identification for the dock 110*a-c*. The distributor 152 may include a vendor, a government agency, and a consumer. The recipient 154 provides the personal information and the financial information for transacting a purchase of the product 158. The personal information may include, without limitation, an address, a name, an age, and contact information. The financial information may include a credit card number and a bank routing number. The recipient 154 provides the unique dock identification for the dock 110*a-c* as a positioning address for the UAV 102 to communicate with the dock 110*a-c*, and thereby deliver the product 158 to the appropriate dock 110*a*.

Figure 11:
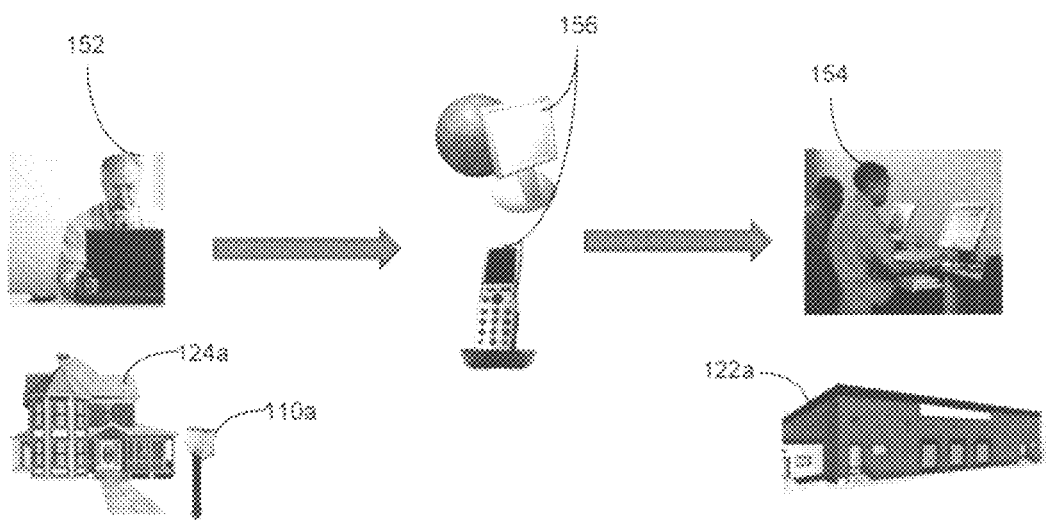
FIG. 11 illustrates a block diagram of a recipient ordering at least one product from a distributor and providing personal information, financial information, and a unique dock identification for transacting the delivery, in accordance with an embodiment of the present invention.

As illustrated in FIG. 11, a Step 206 includes selecting, by the recipient 154, a product 158 to purchase. The product 158 may include any product 158 known in the commercial industry that can be carried by the UAV 102. The selected product 158 may even include large, heavy objects 158, such as vehicles or building materials. Though in other embodiments, mail, liquids, and containers of a gas may also be delivered. Once the recipient 154 has selected the desired product 158, the recipient 154 places an order through a transaction device 156, such as a website, a phone call, and a mail order catalog. Upon receiving the order, the distributor 152 may prepare the product 158 for delivery to the recipient 154.

Figure 12:
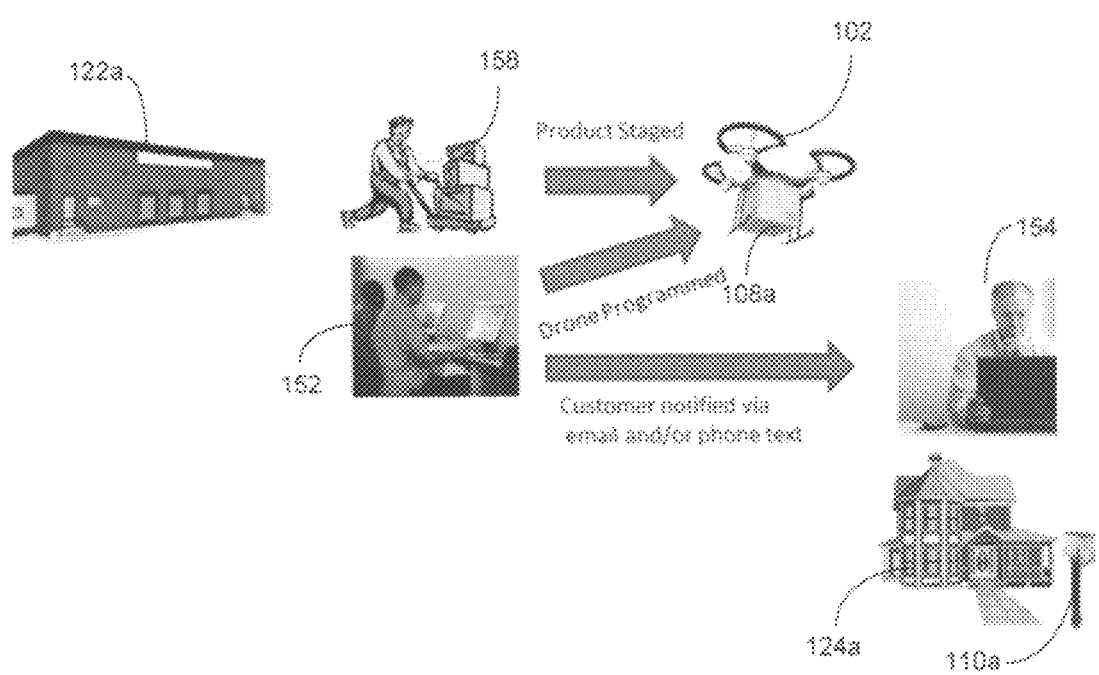
FIG. 12 illustrates a block diagram of the distributor packaging the selected package for the recipient and programming the unmanned aerial vehicle to deliver the package to the dock with the unique dock identification provided by the recipient ordering the product, in accordance with an embodiment of the present invention.

Turning now to FIG. 12, a Step 208 comprises packaging, by a distributor 152, the selected product 158 for delivery to the recipient 154. The distributor 152 finds the selected product 158 in a storage unit and prepares the product 158 for shipping. This may include packaging the product 158 to minimize damage and for loading onto the UAV 102. The packaging may include, without limitation, a crate, a box, and saran wrap. The distributor 152 may also program the UAV 102 to fly to the dock 110*a* of the recipient 154 having the unique dock identification provided by the recipient 154.

A Step 210 includes loading the selected product 158 in an unmanned aerial vehicle. The UAV 102 is defined by a docking portion, a propulsion portion 104, and a package storage portion 106. The package storage portion 106 is configured to receive the packaged product 158. The package storage portion 106 may include, without limitation, a chute, a clamp, and a magnet. The package storage portion 106 may load the product 158 through the help of manual labor. However, in some embodiments, the package storage portion 106 automatically clamps and retains the product 158.

In some embodiments, a Step 212 may include programming the unmanned aerial vehicle with the unique dock identification provided by the recipient 154. Each dock 110*a-c* has a unique dock identification number to distinguish form other docks 110*a-c* in the network of docks 110*a-c*. The unique dock identification configured to help the UAV 102 identify an appropriate dock 110*a* for loading and unloading the package 108*a-c*. A logistical software commands the UAV 102 to fly to the exact position of the appropriate dock 110*a* having the unique dock identification.

In some embodiments, the dock 110*a-c* may include a positioning system 146, such as a GPS, to help guide the UAV 102 to the appropriate dock 110*a*. The positioning system 146 is configured to guide the UAV 102 to the appropriate dock 110*a-c*. An additional Step 214 comprises notifying the recipient 154 that the product 158 is arriving. The recipient 154 is automatically notified by email, text, or phone call that the product 158 is arriving and the approximate arrival time. The distributor 152 or the UAV 102 may notify the recipient 154 that the product 158 is arriving. However, it is not necessary that the recipient 154 be present when the UAV 102 arrives with the package 108*a-c*, since the UAV 102 and the dock 108*a* are generally automated.

A Step 216 includes communicating, by the unmanned aerial vehicle 102 and/or the distributor 152, with the dock 110*a-c* to accept the product 158. A wireless communication device 144 in the dock 110*a-c* enables this wireless communication. In one possible embodiment, the UAV 102 flies to the delivery point 124*a* and signals to the dock 110*a* to open a door 114. Though, the distributor 152 may also actuate the door 114 to open remotely through the logistical software. After delivering the product 158, the UAV 102 returns to the distributor 152 or to a second delivery point 124b. The door 114 on the first dock 110a closes and security is reset accordingly.

A final Step 218 comprises indicating, by the unmanned aerial vehicle 102 and/or the distributor 152, that the product 158 is delivered. The recipient 154 is automatically notified by email, text, or phone call that the product 158 has been deposited into the dock 110a-c. In one embodiment, a visible receipt is left on the dock 110a to indicate that the product 158 has been delivered. From this position, the UAV 102 may proceed to any other dock 110a-c for recharging, maintenance, picking up a package, or performing surveillance over a surveillance area 128. This multifunctional capacity and flexible configuration of both the UAV 102 and the network of docks 110a-c is efficacious for enhancing distribution logistics for the package 108a-c and increasing surveillance range over the surveillance area 128.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A system for enhancing distribution logistics and increasing surveillance ranges with an unmanned aerial vehicle and a network of docks, the system comprising:
   an unmanned aerial vehicle, the unmanned aerial vehicle defined by a package storage portion and a propulsion portion, the package storage portion configured to store at least one package, the propulsion portion configured to transport the unmanned aerial vehicle for delivering and picking up the at least one package;
   at least one dock, the at least one dock configured to store and receive the at least one package and the unmanned aerial vehicle, the at least one dock defined by a housing having a cavity, a door, a unique dock identification, and a positioning system, the door configured to regulate access to the cavity, the unique dock identification configured to help the unmanned aerial vehicle identify an appropriate dock for loading and unloading the package, the positioning system configured to guide the unmanned aerial vehicle to the appropriate dock;
   a dock mount, the dock mount configured to mount the housing at a delivery point or a pickup point;
   a motion detector, the motion detector configured to detect the unmanned aerial vehicle in proximity to the housing, wherein the detection of the unmanned aerial vehicle actuates the door of the housing to move between an open position and a closed position;
   a plurality of light indicators, the plurality of light indicators configured to indicate the operational status of the at least one dock, the plurality of light indicators further configured to indicate presence of the at least one package in the housing of the at least one dock;
   a camera, the camera configured to capture an image of the unmanned aerial vehicle and the at least one package, wherein the image helps determine the presence of the at least one package in the housing, and helps determine mechanical condition of the unmanned aerial vehicle;
   a wireless communication device, the wireless communication device configured to enable communication between the unmanned aerial vehicle and the at least one dock;
   and a logistical software, the logistical software configured to control and monitor the interaction between the unmanned aerial vehicle and the at least one dock.

2. The system of claim 1, wherein the unmanned aerial vehicle is a drone.

3. The system of claim 1, wherein the unmanned aerial vehicle further comprises an onboard power source, the onboard power source includes at least one member selected from the group consisting of:
   a rechargeable battery, an accumulator, an electrical battery, a fuel cell, and a fuel tank.

4. The system of claim 1, wherein the delivery point and the pickup point include at least one member selected from the group consisting of:
   a residential home, a retail store, a commercial warehouses, a governmental building, a central office for a package delivery organization, a warehouse, a fueling depot, and a maintenance garage, or, a land or water-borne vehicle.

5. The system of claim 1, wherein the door is configured to hingedly join with the housing.

6. The system of claim 1, wherein the propulsion portion of the unmanned aerial vehicle is a rotor and blades.

7. The system of claim 1, wherein the package storage portion of the unmanned aerial vehicle includes at least one member selected from the group consisting of:
   a chute, a clamp, a magnet, and an adhesive.

8. The system of claim 1, wherein the dock mount is a pedestal mount or a wall structure mount or rooftop mount.

9. The system of claim 1, wherein the at least one dock is configured to mount in the pickup point and the delivery point.

10. The system of claim 1, wherein the positioning system is a global positioning system.

11. The system of claim 1, further including a dock battery, the dock battery configured to receive power from an alternating current or a direct current.

12. The system of claim 1, wherein the plurality of light indicators comprises a red light emitting diode, a yellow light emitting diode, and a green light emitting diode.

13. The system of claim 1, wherein the camera is an IP-addressable web camera.

14. The system of claim 1, wherein the wireless communication device includes at least one member selected from the group consisting of:
   a wireless router, a Wi-Fi tower, Bluetooth protocol, a smart phone, and Internet.

15. The system of claim 1, wherein the interaction between the unmanned aerial vehicle and the at least one dock that is monitored by the logistical software includes at least one member selected from the group consisting of:
   a sequence of deliveries, a route taken by the unmanned aerial vehicle, permission for the delivery and pickup, a mechanical condition and maintenance of the unmanned aerial vehicle, changes in the delivery route, and weather patterns.

16. The system of claim 1, further including a plurality of remote control range extending devices, the plurality of remote control range extending devices configured to communicate with the wireless communication device of the at least one dock, the plurality of remote control range extending devices configured to enable the unmanned aerial vehicle to fly at an extended range for transporting the at least one package.

17. The system of claim 16, wherein the positioning system, the wireless communication device, and one remote control range extending device of the plurality of remote control range extending devices are integrated in a motherboard.

18. The system of claim 1, wherein the system further comprises a downloadable software application, the downloadable software application configured to receive notification when the unmanned aerial vehicle is proximal to the at least one dock, the downloadable software application further configured to receive notification when the at least one package is present in the housing of the at least one dock.

19. The system of claim 1, wherein the motion detector is configured to detect unauthorized movement in a predetermined surveillance area, wherein the unmanned aerial vehicle is configured to monitor the predetermined surveillance area after the motion detector detects unauthorized movement in the predetermined surveillance area.

20. A system for enhancing distribution logistics in commercial transactions with an unmanned aerial vehicle and a network of docks, the system comprising:
- an unmanned aerial vehicle, the unmanned aerial vehicle defined by a package storage portion, a surveillance portion, and a propulsion portion, the package storage portion configured to store at least one package, the surveillance portion configured to monitor a predetermined range, the propulsion portion configured to transport the unmanned aerial vehicle for delivering and picking up the at least one package, and for monitoring the predetermined range;
- at least one dock, the at least one dock configured to store and receive the at least one package and the unmanned aerial vehicle, the at least one dock defined by a housing having a cavity, a door, a unique dock identification, and a positioning system, the door configured to regulate access to the cavity, the unique dock identification configured to help the unmanned aerial vehicle identify an appropriate dock for loading and unloading the package, the positioning system configured to guide the unmanned aerial vehicle to the appropriate dock;
- a dock mount, the dock mount configured to mount the housing at a delivery point or a pickup point;
- a motion detector, the motion detector configured to detect the unmanned aerial vehicle in proximity to the housing, wherein detection of the unmanned aerial vehicle actuates the door of the housing to move between an open position and a closed position;
- a plurality of light indicators, the plurality of light indicators configured to indicate the operational status of the at least one dock, the plurality of light indicators further configured to indicate presence of the at least one package in the housing of the at least one dock;
- a camera, the camera configured to capture an image of the unmanned aerial vehicle and the at least one package, wherein the image helps determine the presence of the at least one package in the housing, and the condition of the unmanned aerial vehicle;
- a wireless communication device, the wireless communication device configured to enable communication between the unmanned aerial vehicle and the at least one dock;
- a logistical software, the logistical software configured to control and monitor the interaction between the unmanned aerial vehicle and the at least one dock;
- and a plurality of remote control range extending devices, the plurality of remote control range extending devices configured to communicate with the wireless communication device of the at least one dock, the plurality of remote control range extending devices configured to enable the unmanned aerial vehicle to fly at an extended range for transporting the at least one package and for monitoring the predetermined range.

* * * * *